US009215538B2

(12) United States Patent
Rauhala

(10) Patent No.: US 9,215,538 B2
(45) Date of Patent: Dec. 15, 2015

(54) METHOD AND APPARATUS FOR AUDIO SIGNAL CLASSIFICATION

(75) Inventor: Jukka Vesa Tapani Rauhala, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 353 days.

(21) Appl. No.: 13/388,988

(22) PCT Filed: Aug. 4, 2009

(86) PCT No.: PCT/EP2009/060122
§ 371 (c)(1),
(2), (4) Date: Apr. 13, 2012

(87) PCT Pub. No.: WO2011/015237
PCT Pub. Date: Feb. 10, 2011

(65) Prior Publication Data
US 2013/0103398 A1    Apr. 25, 2013

(51) Int. Cl.
*G10L 15/00* (2013.01)
*H04R 29/00* (2006.01)
*G10L 25/78* (2013.01)
*G10L 15/20* (2006.01)

(52) U.S. Cl.
CPC ............... *H04R 29/00* (2013.01); *G10L 15/20* (2013.01); *G10L 25/78* (2013.01); *G10H 2210/046* (2013.01); *G10H 2240/251* (2013.01)

(58) Field of Classification Search
CPC ..... G10L 15/20; G10L 25/78; G10L 21/0208; G10L 15/02; G10L 25/87
See application file for complete search history.

(56) References Cited

U.S. PATENT DOCUMENTS

| 4,133,976 A * | 1/1979 | Atal et al. ............. 704/226 |
| 4,541,110 A * | 9/1985 | Hopf et al. ............ 704/231 |
| 5,208,864 A * | 5/1993 | Kaneda .............. 704/258 |
| 5,220,611 A * | 6/1993 | Nakamura et al. ........ 704/278 |
| 5,298,674 A * | 3/1994 | Yun ................... 84/616 |
| 5,771,486 A * | 6/1998 | Chan et al. ............ 704/200 |
| 5,812,970 A * | 9/1998 | Chan et al. ............ 704/226 |
| 5,878,391 A * | 3/1999 | Aarts ................. 704/233 |

(Continued)

FOREIGN PATENT DOCUMENTS

| CN | 1426563 A | 6/2003 |
| EP | 1692799 A2 | 8/2006 |
| WO | 2007/070337 A2 | 6/2007 |

OTHER PUBLICATIONS

Panagiotakis, Costas, and Georgios Tziritas. "A speech/music discriminator based on RMS and zero-crossings." Multimedia, IEEE Transactions on 7.1 (2005): 155-166.*

(Continued)

*Primary Examiner* — Pierre-Louis Desir
*Assistant Examiner* — Fariba Sirjani
(74) *Attorney, Agent, or Firm* — Harrington & Smith

(57) ABSTRACT

An apparatus comprising at least one processor and at least one memory including computer program code the at least one memory and the computer program code configured to, with the at least one processor, cause the apparatus at least to perform determining a signal identification value for an audio signal, determining at least one noise level value for the audio signal, comparing the signal identification value against a signal identification threshold and each of the at least one noise level value against an associated noise level threshold, and identifying the audio signal dependent on the comparison.

17 Claims, 3 Drawing Sheets

(56) References Cited

U.S. PATENT DOCUMENTS

| | | | |
|---|---|---|---|
| 5,918,223 A * | 6/1999 | Blum et al. | 1/1 |
| 6,556,967 B1 * | 4/2003 | Nelson et al. | 704/233 |
| 6,570,991 B1 * | 5/2003 | Scheirer et al. | 381/110 |
| 6,694,293 B2 * | 2/2004 | Benyassine et al. | 704/229 |
| 6,714,909 B1 * | 3/2004 | Gibbon et al. | 704/246 |
| 6,785,645 B2 * | 8/2004 | Khalil et al. | 704/216 |
| 6,801,895 B1 * | 10/2004 | Huang et al. | 704/270 |
| 7,035,793 B2 * | 4/2006 | Jiang et al. | 704/214 |
| 7,242,421 B2 * | 7/2007 | Center et al. | 348/14.1 |
| 7,328,153 B2 * | 2/2008 | Wells et al. | 704/231 |
| 7,454,333 B2 * | 11/2008 | Ramakrishnan et al. | 704/228 |
| 7,552,120 B2 * | 6/2009 | Essafi et al. | 1/1 |
| 7,574,276 B2 * | 8/2009 | Weare et al. | 700/94 |
| 7,593,850 B2 * | 9/2009 | Berg et al. | 704/226 |
| 7,660,714 B2 * | 2/2010 | Furuta et al. | 704/228 |
| 7,774,203 B2 * | 8/2010 | Wang et al. | 704/254 |
| 7,844,452 B2 * | 11/2010 | Takeuchi et al. | 704/226 |
| 7,873,511 B2 * | 1/2011 | Herre et al. | 704/205 |
| 8,046,218 B2 * | 10/2011 | Allen et al. | 704/233 |
| 8,050,916 B2 * | 11/2011 | Liu et al. | 704/233 |
| 8,090,120 B2 * | 1/2012 | Seefeldt | 381/104 |
| 8,126,706 B2 * | 2/2012 | Ebenezer | 704/220 |
| 8,144,881 B2 * | 3/2012 | Crockett et al. | 381/56 |
| 8,195,451 B2 * | 6/2012 | Toguri | 704/211 |
| 8,311,821 B2 * | 11/2012 | Breebaart et al. | 704/234 |
| 8,437,482 B2 * | 5/2013 | Seefeldt et al. | 381/104 |
| 8,635,065 B2 * | 1/2014 | Goronzy-Thomae et al. | 704/245 |
| 2004/0044525 A1 * | 3/2004 | Vinton et al. | 704/224 |
| 2004/0078188 A1 * | 4/2004 | Gibbon et al. | 704/1 |
| 2004/0083107 A1 * | 4/2004 | Noda et al. | 704/270 |
| 2004/0167767 A1 * | 8/2004 | Xiong et al. | 704/1 |
| 2004/0236571 A1 * | 11/2004 | Laurila et al. | 704/210 |
| 2005/0091066 A1 * | 4/2005 | Singhal | 704/500 |
| 2005/0096898 A1 * | 5/2005 | Singhal | 704/205 |
| 2005/0126369 A1 * | 6/2005 | Kirkeby et al. | 84/615 |
| 2006/0015333 A1 * | 1/2006 | Gao | 704/233 |
| 2006/0122834 A1 * | 6/2006 | Bennett | 704/256 |
| 2006/0229878 A1 * | 10/2006 | Scheirer | 704/273 |
| 2007/0271093 A1 | 11/2007 | Wang et al. | |
| 2008/0033583 A1 * | 2/2008 | Zopf | 700/94 |
| 2010/0027820 A1 * | 2/2010 | Kates | 381/312 |
| 2010/0036660 A1 * | 2/2010 | Bennett | 704/231 |
| 2010/0046765 A1 * | 2/2010 | De Bruijn et al. | 381/58 |
| 2010/0179808 A1 * | 7/2010 | Brown | 704/225 |
| 2010/0329473 A1 * | 12/2010 | Rauhala | 381/71.1 |
| 2011/0035213 A1 * | 2/2011 | Malenovsky et al. | 704/208 |
| 2012/0300949 A1 * | 11/2012 | Rauhala et al. | 381/55 |
| 2012/0310635 A1 * | 12/2012 | Muesch | 704/225 |
| 2013/0103398 A1 * | 4/2013 | Rauhala | 704/233 |
| 2013/0144615 A1 * | 6/2013 | Rauhala et al. | 704/225 |

OTHER PUBLICATIONS

Changsheng Xu ; Maddage, M.C ; Xi Shao, "Automatic music classification and summarization", Speech and Audio Processing, IEEE Transactions on (vol. 13 , Issue: 3 ), 2005, pp. 441-450.*

Audio feature extraction and analysis for scene segmentation and classification Z Liu, Y Wang, T Chen—Journal of VLSI signal processing 20, 61-79 (1998).*

Munoz-Exposito et al., "New Speech/Music Discrimination Approach Based on Warping Transformation and ANFIS", Journal of New Music Research, vol. 35, No. 3, 2006, pp. 237-247.

El-Maleh et al., "Speech/Music Discrimination for Multimedia Applications", IEEE International Conference on Acoustics, Speech, and Signal Processing, vol. 4, 2000, 4 pages.

Panagiotakis et al., "A Speech/Music Discriminator Based on RMS and Zero-Crossings", IEEE Transactions on Multimedia, vol. 7, Issue 1, Feb. 2005, pp. 155-166.

Song et al., "Discrimination of Music Signals for Mobile Broadcasting Receivers", AES 34th International Conference: New Trends in Audio for Mobile and Handheld Devices, Aug. 28-30, 2008, pp. 1-3.

International Search Report and Written Opinion received for corresponding Patent Cooperation Treaty Application No. PCT/EP2009/060122, dated Apr. 19, 2010, 14 pages.

Thoshkahna et al., "A Speech-Music Discriminator Using HILN Model Based Features", IEEE International Conference on Acoustics, Speech and Signal Processing, vol. 5, May 14-19, 2006, pp. V425-V428.

Jelinek et al., "Robust Signal/Noise Discrimination for Wideband Speech and Audio Coding", In Proceedings of IEEE Workshop on Speech Coding, 2000, pp. 151-153.

Office Action received for corresponding Chinese Patent Application No. 200980161483.0, dated Mar. 11, 2013, 7 pages of Office Action and 5 pages of Office Action translation.

Office Action received for corresponding Chinese Application No. 200980161483.0, dated Oct. 8, 2013, 6 pages.

* cited by examiner

METHOD AND APPARATUS FOR AUDIO SIGNAL CLASSIFICATION

RELATED APPLICATION

This application was originally filed as Patent Cooperation Treaty Application No. PCT/EP2009/060122 filed Aug. 4, 2009.

TECHNICAL FIELD

The present invention relates to an apparatus for audio signal classification. The invention further relates to, but is not limited to, an apparatus for use in mobile devices.

BACKGROUND

In many applications there is a strong interest in identifying and classifying audio signals. One such classification is automatically identifying when an audio signal is a speech audio signal, a music audio signal, or silence. Whereas a human listener can easily discriminate between speech and music audio signals, for example by listening to a short segment for a few seconds, automatic identification or discrimination has been found to be a technically difficult problem.

Such identification of whether the audio signal is music or speech is particularly beneficial in wireless communications system apparatus. Audio signal processing within the apparatus in wireless communication systems can implement different encoding and decoding algorithms to the signal depending on whether or not the signal is speech, music or silence. The type of algorithm used can more optimally address the characteristics of the audio signal in question and thus optimally process the signal so not to lose intelligibility in the speech audio signal, not to significantly degrade the fidelity of the music audio signal and not to use significant network resources in communicating silence.

Automated audio signal classification for speech and music audio signals has been tackled many times previously. Often these approaches require complex analysis using pattern recognition apparatus such as neural nets to attempt to classify whether or not the signal is speech or music. However such processing heavy approaches are not suitable for communications equipment and particularly portable devices where processing capacity carries power consumption and cost penalties.

SUMMARY

For example the automatic classification of downlink encoded audio signals received at user equipment from base stations in cellular wireless communications systems would not be suitable for processing power hungry techniques as neural net processing. Furthermore in such environments there are three specific obstacles to overcome.

Firstly, the audio signal is typically encoded and decoded using an adaptive multi-rate (AMR) compression scheme. AMR encoding, which uses such techniques as algebraic code excited linear prediction (ACELP), selects a codec mode to meet the local radio channel capacity requirements. This codec selection for the AMR coding affects the audio signal significantly.

Secondly, the identifier or classifier as indicated above is required to be as efficient as possible in order that it may be implemented within a user equipment without requiring significant processing or power requirements and affect the user equipment ability to communicate.

Thirdly, the identifier or classifier should generate a low probability of false positive identifications of music. In other words, the possibility that the algorithm identifies speech as music must be very low. As the role of the user equipment is one of providing speech communication, false positive classification of music where the audio signal is actually speech could result in a degrading of the speech audio signal as a music codec or music codec settings are selected to decode the speech audio signal.

It is an aim of at least some embodiments of the application to address one or more of these problems.

There is according to the invention a method comprising: determining a signal identification value for an audio signal; determining at least one noise level value for the audio signal; comparing the signal identification value against a signal identification threshold and each of the at least one noise level value against an associated noise level threshold; and identifying the audio signal dependent on the comparison.

The identifying the audio signal may comprise identifying the audio signal as a music audio signal when the signal identification value is less than the signal identification threshold and at least one of the at least one noise level value is less than the associated noise level threshold.

The identifying the audio signal may further comprise identifying the audio signal as a speech audio signal when either the signal identification value is equal or more than the signal identification threshold and/or all of the at least one noise level value is equal or more than the associated noise level threshold.

The determining a signal identification value may comprise: low pass filtering the audio signal sample values; determining at least two root mean square values for the low pass filtered audio signal values; selecting the maximum root mean square value and the minimum root mean square value from the root mean square values; determining a ratio of the maximum root mean square value and the minimum root mean square value; and low pass filtering the ratio of the maximum root mean square value and the minimum root mean square value.

The method may further comprise: determining the minimum root mean square value is less than a signal level threshold; and discarding the determined ratio of the maximum root mean square value and the minimum root mean square value dependent on determining the minimum root mean square value is less than a signal level threshold.

Determining one of the at least one noise level value for the audio signal may comprise: high pass filtering the audio signal sample values; determining at least two root mean square values for the high pass filtered audio signal values; selecting a minimum root mean square value from the root mean square values; and low pass filtering the minimum root mean square value from the root mean square values to determine one of the at least one noise level value for the audio signal.

Determining a second of the at least one noise level value for the audio signal may comprise: high pass filtering the audio signal sample values; determining at least two root mean square values for the high pass filtered audio signal values; selecting a minimum root mean square value from the root mean square values for the high pass filtered audio signal values; low pass filtering the minimum root mean square value from the root mean square values for the high pass filtered audio signal values; low pass filtering the audio signal sample values; determining at least two root mean square values for the low pass filtered audio signal values; selecting the minimum root mean square value from the root mean square values for the low pass filtered audio signal values; low pass filtering the minimum root mean square value from the low pass filtered audio signal values; determining a ratio of the low pass filtered minimum root mean square values from the low pass filtered and high pass filtered audio signals; and determining the second of the at least one noise level value for the audio signal to be either the ratio of the low pass filtered minimum root mean square values from the low pass filtered and high pass filtered audio signals or a previous ratio of the low pass filtered minimum root mean square values.

The method may further comprise buffering the at least two root mean square values for the low pass filtered audio signal values.

The method may further comprise resetting the buffered values.

The method may further comprise buffering the at least two root mean square values for the high pass filtered audio signal values.

The method may further comprise resetting the buffered values.

The method may further comprise decoding the audio signal dependent on the identifying.

The method may further comprise selecting music to be played from a music library dependent on the identifying.

The method may further comprise implementing a speech to text application dependent on the identifying.

According to a second aspect of the invention there is provided an apparatus comprising at least one processor and at least one memory including computer program code the at least one memory and the computer program code configured to, with the at least one processor, cause the apparatus at least to perform: determining a signal identification value for an audio signal; determining at least one noise level value for the audio signal; comparing the signal identification value against a signal identification threshold and each of the at least one noise level value against an associated noise level threshold; and identifying the audio signal dependent on the comparison.

The identifying the audio signal may cause the apparatus at least to perform identifying the audio signal as a music audio signal when the signal identification value is less than the signal identification threshold and at least one of the at least one noise level value is less than the associated noise level threshold.

The identifying the audio signal may further cause the apparatus at least to perform identifying the audio signal as a speech audio signal when either the signal identification value is equal or more than the signal identification threshold and/or all of the at least one noise level value is equal or more than the associated noise level threshold.

The determining the signal identification value may cause the apparatus at least to perform: low pass filtering the audio signal sample values; determining at least two root mean square values for the low pass filtered audio signal values; selecting the maximum root mean square value and the minimum root mean square value from the root mean square values; determining a ratio of the maximum root mean square value and the minimum root mean square value; and low pass filtering the ratio of the maximum root mean square value and the minimum root mean square value.

The at least one processor and at least one memory may further cause the apparatus at least to perform: determining the minimum root mean square value is less than a signal level threshold; and discarding the determined ratio of the maximum root mean square value and the minimum root mean square value dependent on determining the minimum root mean square value is less than a signal level threshold.

Determining one of the at least one noise level value for the audio signal may cause the apparatus at least to perform: high pass filtering the audio signal sample values; determining at least two root mean square values for the high pass filtered audio signal values; selecting a minimum root mean square value from the root mean square values; and low pass filtering the minimum root mean square value from the root mean square values to determine one of the at least one noise level value for the audio signal.

Determining a second of the at least one noise level value for the audio signal may cause the apparatus at least to perform: high pass filtering the audio signal sample values; determining at least two root mean square values for the high pass filtered audio signal values; selecting a minimum root mean square value from the root mean square values for the high pass filtered audio signal values; low pass filtering the minimum root mean square value from the root mean square values for the high pass filtered audio signal values; low pass filtering the audio signal sample values; determining at least two root mean square values for the low pass filtered audio signal values; selecting the minimum root mean square value from the root mean square values for the low pass filtered audio signal values; low pass filtering the minimum root mean square value from the low pass filtered audio signal values; determining a ratio of the low pass filtered minimum root mean square values from the low pass filtered and high pass filtered audio signals, and determining the second of the at least one noise level value for the audio signal to be either the ratio of the low pass filtered minimum root mean square values from the low pass filtered and high pass filtered audio signals or a previous ratio of the low pass filtered minimum root mean square values.

The at least one processor and at least one memory may further cause the apparatus at least to perform buffering the at least two root mean square values for the low pass filtered audio signal values.

The at least one processor and at least one memory may further cause the apparatus at least to perform resetting the buffered values.

The at least one processor and at least one memory may further cause the apparatus at least to perform buffering the at least two root mean square values for the high pass filtered audio signal values.

The at least one processor and at least one memory may further cause the apparatus at least to perform resetting the buffered values.

The at least one processor and at least one memory may further cause the apparatus at least to perform decoding the audio signal dependent on the identifying.

The at least one processor and at least one memory may further cause the apparatus at least to perform selecting music to be played from a music library dependent on the identifying.

The at least one processor and at least one memory may further cause the apparatus at least to perform implementing a speech to text application dependent on the identifying.

According to a third aspect of the invention there is provided apparatus comprising: a signal parameter estimator configured to determine a signal identification value for an audio signal; a noise level estimator configured to determine at least one noise level value for the audio signal; and a signal classifier configured to identify the audio signal dependent on comparing the signal identification value against a signal identification threshold and each of the at least one noise level value against an associated noise level threshold.

The signal classifier is preferably configured to identify the audio signal as a music audio signal when the signal identification value is less than the signal identification threshold and at least one of the at least one noise level value is less than the associated noise level threshold.

The signal classifier is preferably further configured to identify the audio signal as a speech audio signal when either the signal identification value is equal or more than the signal identification threshold and/or all of the at least one noise level value is equal or more than the associated noise level threshold.

The signal parameter estimator may comprise: a low pass filter configured to low pass filter audio signal sample values; a signal processor configured to determine at least two root mean square values for the low pass filtered audio signal values; at least one selector configured to select the maximum root mean square value and the minimum root mean square value from the root mean square values; a ratio calculator configured to determine a ratio of the maximum root mean square value and the minimum root mean square value; and a further low pass filter configured to low pass filter the ratio of the maximum root mean square value and the minimum root mean square value.

The signal parameter estimator may further comprise: a switch configured to discard the determined ratio of the maximum root mean square value and the minimum root mean square value dependent on determining the minimum root mean square value is less than a signal level threshold.

The noise level estimator may comprise: a high pass filter configured to high pass filtering the audio signal sample values; a signal processor configured to determine at least two root mean square values for the high pass filtered audio signal values; a selector configured to select a minimum root mean square value from the root mean square values; and a low pass filter low pass filtering the minimum root mean square value from the root mean square values to determine one of the at least one noise level value for the audio signal.

The noise level estimator may further comprise: a low pass filter configured to low pass filter the minimum root mean square value from the signal parameter estimator at least one selector; a ratio estimator configured to determine a ratio of the low pass filtered minimum root mean square value from the signal parameter estimator at least one selector and from the noise level estimator selector; and a switch configured to output as a second of the at least one noise level value either the ratio determined by the ratio estimator or a historical ratio value.

The switch is preferably configured to output at the second of the at least one noise level vale the ratio determined by the ratio value when the ratio determined by the ratio determiner is greater than the historical ratio value and the one of the at least one noise level value for the audio signal is greater than the associated threshold value.

The noise level estimator may further comprise a buffer configured to receive the output of the switch and a gain configured to apply a gain to the output of the buffer to generate the historical ratio value.

The signal parameter estimator may further comprise at least one buffer configured to buffer the at least two root mean square values for the low pass filtered audio signal values.

The apparatus may further comprise a buffer controller configured to reset the buffered values.

The noise level estimator may further comprise at least one buffer configured to buffer the at least two root mean square values for the high pass filtered audio signal values.

The apparatus may further comprise a further buffer controller configured to reset the noise level estimator buffer buffered values.

The apparatus may further comprise a decoder configured to decode the audio signal dependent on the signal classifier.

The apparatus may further comprise a processor configured to select music to be played from a music library dependent on the signal classifier.

The apparatus may further comprise a processor configured to implement a speech to text application dependent on the signal classifier.

According to a fourth aspect of the invention there is provided a computer-readable medium encoded with instructions that, when executed by a computer, perform: determining a signal identification value for an audio signal; determining at least one noise level value for the audio signal; comparing the signal identification value against a signal identification threshold and each of the at least one noise level value against an associated noise level threshold; and identifying the audio signal dependent on the comparison.

According to a fifth aspect of the invention there is provided an apparatus comprising: means for determining a signal identification value for an audio signal; means for determining at least one noise level value for the audio signal; means for comparing the signal identification value against a signal identification threshold and each of the at least one noise level value against an associated noise level threshold; and means for identifying the audio signal dependent on the comparison.

An electronic device may comprise apparatus as described above.

A chipset may comprise apparatus as described above.

BRIEF DESCRIPTION OF THE DRAWINGS

For better understanding of the present invention, reference will now be made by way of example to the accompanying drawings in which.

DETAILED DESCRIPTION

Figure 1:
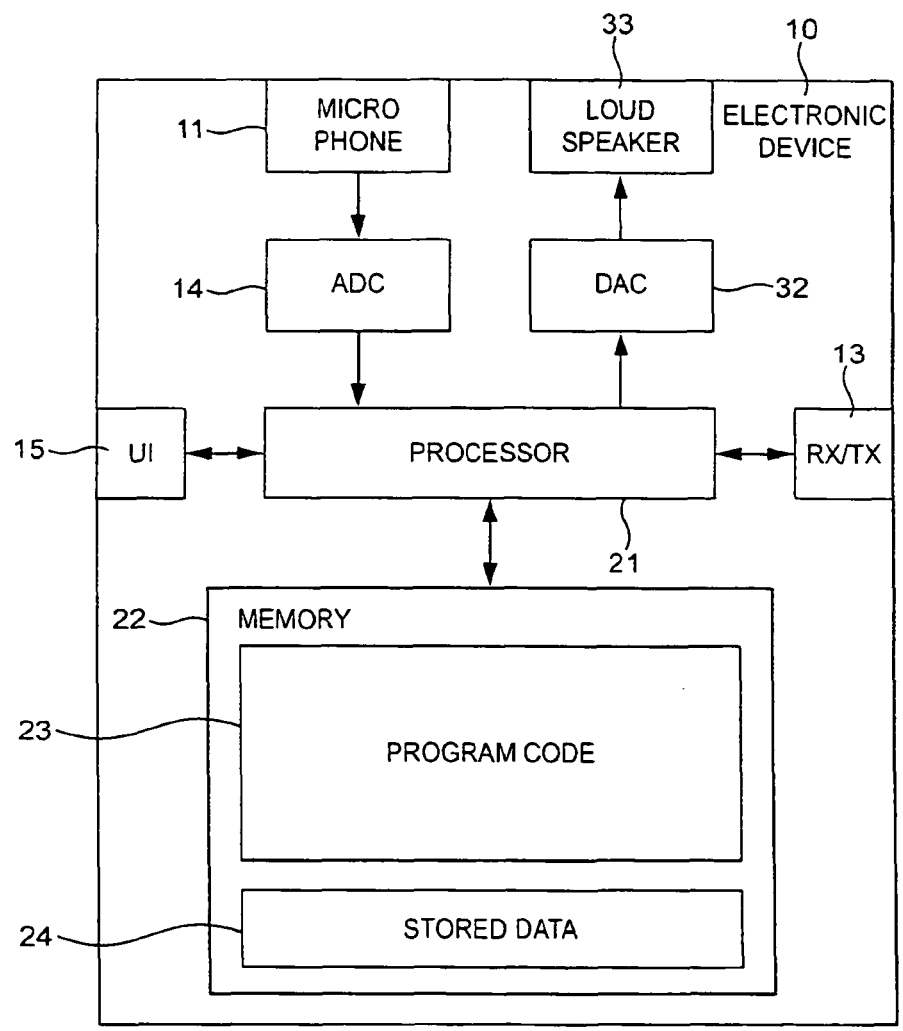
FIG. 1 shows schematically an electronic device employing some embodiments of the application.

The following describes in further detail suitable apparatus and possible mechanisms for the provision of identifying or classifying received downlink audio signals as containing speech or music. In this regard reference is first made to FIG. 1 which shows a schematic block diagram of an exemplary apparatus or electronic device 10, which identifies from a low pass filtered signal the maximum and minimum root mean squared (RMS) values within a number of frames. In such apparatus in order to improve the robustness with regards to noise, a background noise estimator is implemented for detecting cases where identification is not possible due to noise. The apparatus thus described may have three main advantages. Firstly, the apparatus may be targeted to prioritise speech and thus produce low false positive music detections. Secondly the apparatus may be operated to take into account levels of noise. Thirdly the apparatus may be implemented into user equipment due to relative simplicity and low complexity of the solution and apparatus required to implement the solution.

The electronic device 10 may in some embodiments be a mobile terminal or user equipment of a wireless communication system.

The electronic device 10 in some embodiments comprises a microphone 11, which is linked via an analogue-to-digital converter (ADC) 14 to a processor 21. The processor 21 is further linked via a digital-to-analogue (DAC) converter 32 to loudspeakers 33 in some embodiments. The processor 21 is further linked to a transceiver (TX/RX) 13, to a user interface (UI) 15 and to a memory 22 in some embodiments.

The processor 21 may in some embodiments be configured to execute various program codes. The implemented program codes may in some embodiments comprise encoding code routines. The implemented program codes 23 may further comprise in some embodiments an audio decoding code. Furthermore the implemented program codes may comprise classification code routines in some embodiments. The implemented program codes 23 may be stored for example in the memory 22 for retrieval by the processor 21 whenever needed. The memory 22 may further provide a section 24 for storing data.

The user interface 15 may enable a user in some embodiments to input commands to the electronic device 10, for example via a keypad, and/or to obtain information from the electronic device 10, for example via a display. The transceiver 13 enables in some embodiments communication with other electronic devices, for example via a wireless communication network. The transceiver 13 may in some embodiments be configured to communicate to other electronic devices by a wired connection.

It is to be understood again that the structure of the electronic device 10 could be supplemented and varied in many ways.

A user of the electronic device 10 may in some embodiments use the microphone 11 for inputting speech, or other sound signal, that is to be transmitted to some other electronic device or that is to be stored in the data section 24 of the memory 22. A corresponding application may in some embodiments be activated to this end by the user via the user interface 15. This application, which may be run by the processor 21, causes the processor 21 to execute the encoding code stored in the memory 22.

The analogue-to-digital converter 14 may in some embodiments convert the input analogue audio signal into a digital audio signal and provides the digital audio signal to the processor 21.

The transceiver 13 in some embodiments may receive the bit stream for transmission to another electronic device. Alternatively, the coded data could be stored in the data section 24 of the memory 22, for instance for a later transmission or for a later presentation by the same electronic device 10.

The processor 21 may also be configured in some embodiments to classify or identify the digital audio signal according to a speech/music audio classification using the classifying code stored in the memory 22.

The electronic device 10 may also receive in some embodiments a bit stream with correspondingly encoded data from another electronic device, such as a base station, via the transceiver 13. In this case, the processor 21 may execute the decoding program code stored in the memory 22 in some embodiments to decode the received data, and provide the decoded data to a speech/music audio classification process as will be further described in detail later in the application. In some embodiments the processor may apply a speech/music audio classification process before executing the decoding process, where the decoding process is at least partially determined dependent on the results of the classification process.

Furthermore the processor may provide the decoded data in some embodiments to the digital-to-analogue converter 32. The digital-to-analogue converter 32 may convert the digital decoded data into analogue audio data in some embodiments and output the analogue signal to the loudspeakers 33. Execution of the decoding program code could be triggered as well by an application that has been called by the user via the user interface 15.

In some embodiments the loudspeakers 33 may be supplemented with or replaced by a headphone set which may communicate to the electronic device 10 or apparatus wirelessly, for example by a Bluetooth profile to communicate via the transceiver 13, or using a conventional wired connection.

Figure 2:
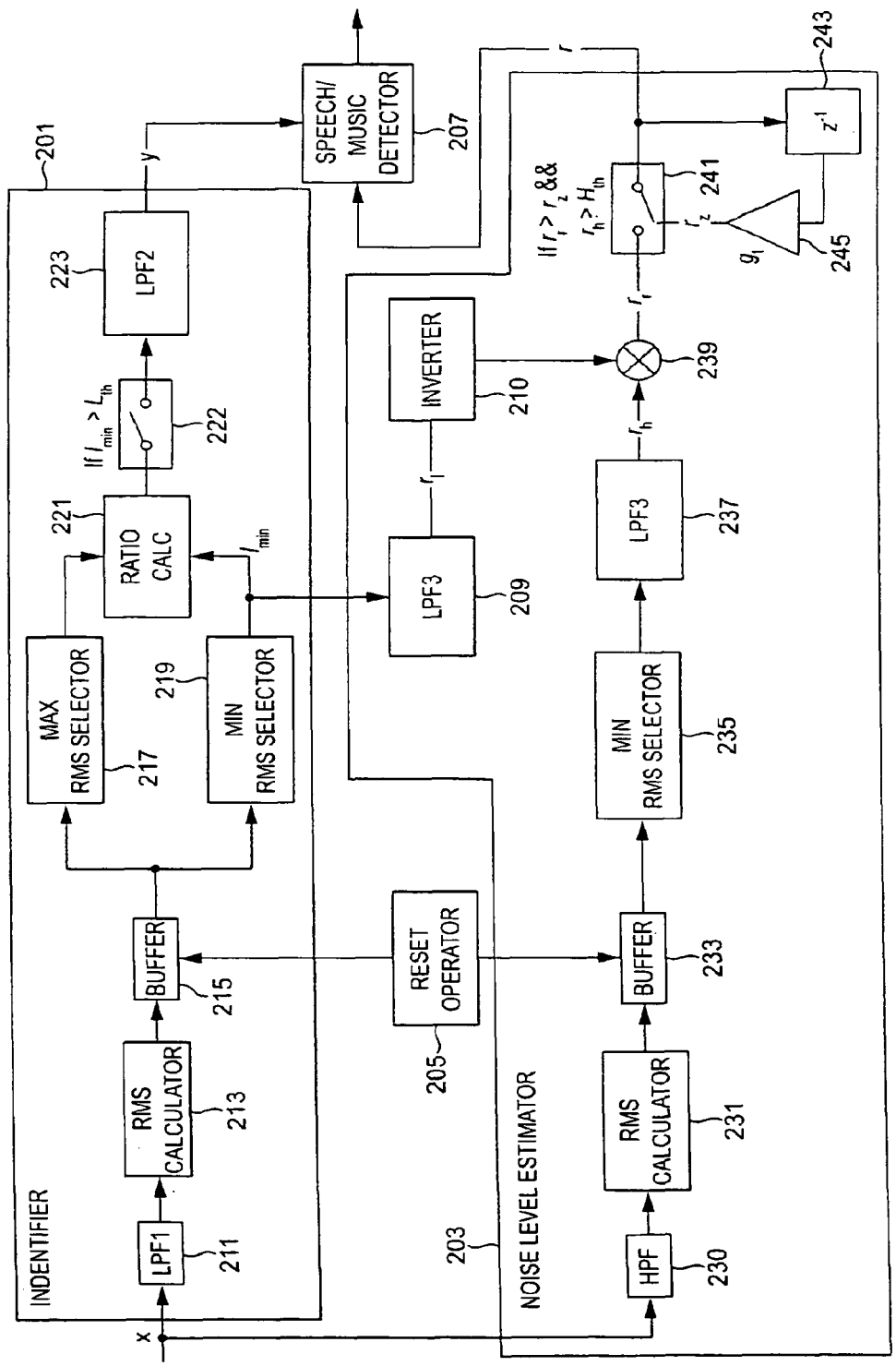
FIG. 2 shows schematically apparatus suitable according to some embodiments of the application.
Figure 3:
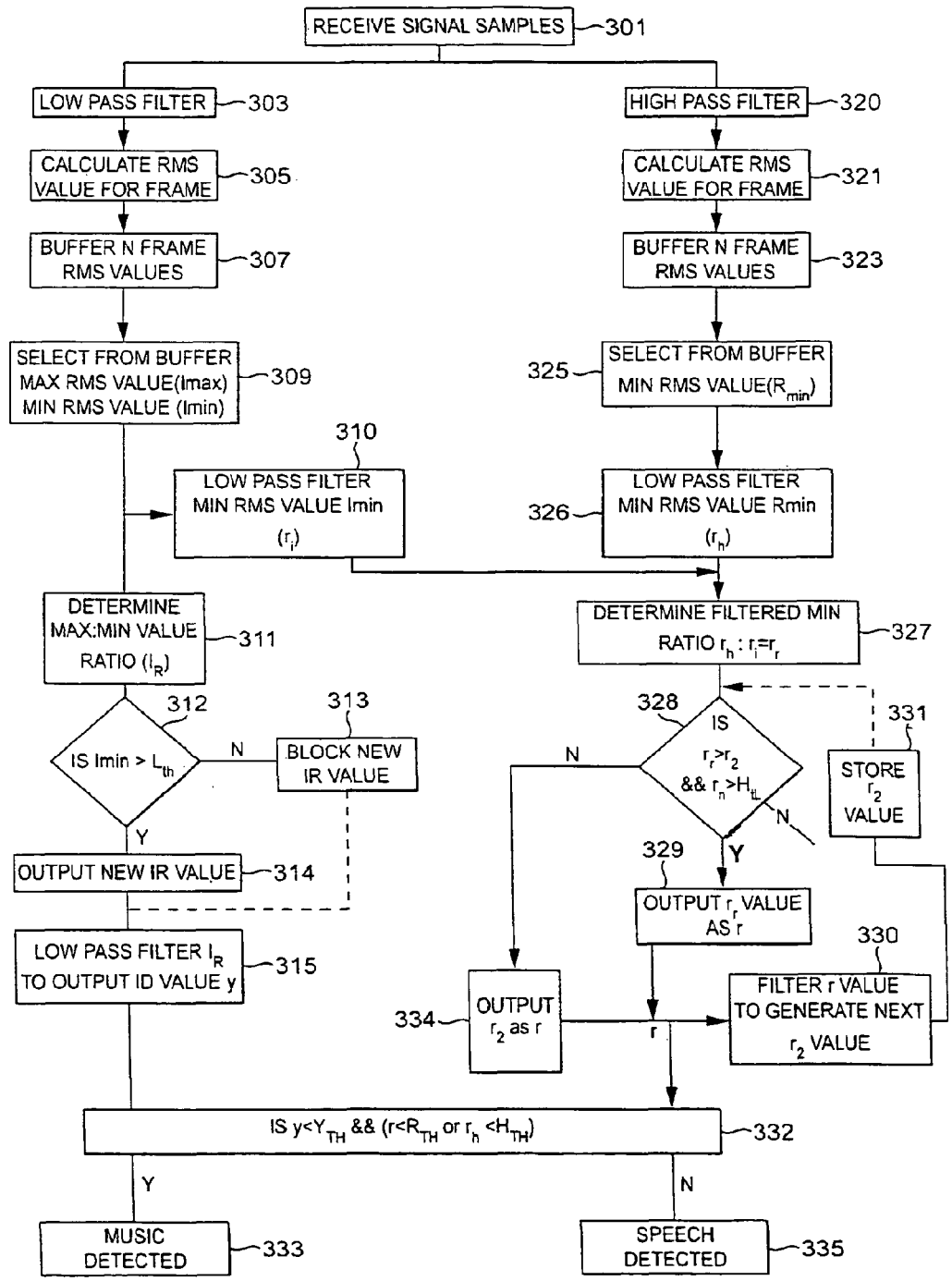
FIG. 3 shows a flow diagram of the operation of the identification and noise level estimation apparatus shown in FIG. 2.

It would be appreciated that the schematic structures described in FIG. 2 and the method steps in FIG. 3 represent only a part of the operation of a user equipment as exemplarily shown implemented in the electronic device shown in FIG. 1.

With respect to FIG. 2, an apparatus suitable for carrying out the operations of some embodiments of the application is shown. The apparatus comprises an identifier 201 configured in some embodiments to receive the audio signal and produce a signal identification value, a noise level estimator 203 configured in some embodiments to also receive the audio signal and produce an estimate of the noise level, and a speech/music detector configured in some embodiments to receive the outputs of the identifier 201 and noise level estimator 203 and determine a classification of the audio signal in terms of whether the audio signal is music or speech.

In some embodiments the identifier 201, noise level estimator 203 and speech/music detector 207 represent processors configured to carry out the processes described below, which are located in the same, or different chipsets.

Alternatively, the processor 21 is configured to carry out all the processes and FIG. 2 exemplifies the analysis and classification of the audio signal according to some embodiments of the application.

The identifier 201 may comprise, in some embodiments, a first low pass filter (LPF1) 211 which is configured to receive the samples of the audio signal. The operation of receiving signal samples at the identifier is shown in FIG. 3 by step 301.

The first low pass filter 211 may be configured dependent on the embodiment with suitable roll off frequency and roll off gradient to improve the noise tolerance of the identifier 201 by removing high frequency components of the audio signal. The output of the low pass filter 211 is passed to the frame root mean squared (RMS) calculator 213. The operation of applying a low pass filtering to the signal samples is shown in FIG. 3 by step 303.

The identifier 201 may in some embodiments also comprise a frame root mean squared calculator 213. The frame root mean square (RMS) calculator 213 receives the low pass filtered audio signal samples and calculates for a frame the root mean square value. In some embodiments the RMS calculator may calculate the RMS value for the frame sample values using the following equation:

$$\mathrm{RMS} = \sqrt{\left(\frac{1}{M}\sum_{i=1}^{i=M} x_i^2\right)},$$

where M is the length of the frame and $x_i$ the filtered value of the i'th sample within the frame. The frame RMS calculator 213 outputs the root mean square value for the frame to the buffer 215. The calculation of the RMS value for the frame is shown in FIG. 3 by step 305.

The identifier 201 may in some embodiments also comprise a buffer 215. The buffer 215 in some embodiments receives the frame RMS value and stores it in the buffer 215 memory. The buffer 215 is configured to store the last N frame RMS values. In some embodiments the value N is 10. In some embodiments the value of N is predefined. In some embodiments the value of N may be changed. As the value of N determines the attack time for determining whether the audio signal is music the smaller the value the better in terms of having a short detection latency. Thus it is believed that some embodiments may be implemented with values of N as small as 2 and as large as 100, but preferably the range of values in some embodiments may be from 5 to 20. The buffering of N frame RMS values is shown in FIG. 3 by step 307. The buffer 215 in some embodiments outputs the RMS values for the last N frames to both the maximum RMS selector 217 and the minimum RMS selector 219.

The identifier 201 may in some embodiments also comprise a maximum RMS selector 217. The maximum RMS selector 217 in some embodiments receives the buffer RMS values for the last N frames and selects the maximum RMS value $I_{max}$ from the last N frames. The selected maximum RMS value $I_{max}$ may in some embodiments be passed to the ratio calculator 221.

The identifier 201 may in some embodiments also comprise a minimum RMS selector 219. The minimum RMS selector 219 in some embodiments also receives the RMS values for the last N frames and selects the minimum RMS value $I_{min}$ from these last N RMS values. The minimum RMS value $I_{min}$ for the N frames in some embodiments is also passed to the ratio calculator 221.

The selection of the maximum $I_{max}$ and minimum $I_{min}$ RMS values from the last N frame RMS values is shown in FIG. 3 by step 309.

The identifier 201 may in some embodiments also comprise a ratio calculator 221. The ratio calculator 221 in some embodiments receives the maximum RMS value and minimum RMS values from the last N frame RMS values and calculates the ratio of the maximum to minimum RMS value. The ratio $I_r$ calculated by the ratio calculator 221 may then in some embodiments be passed to an identifier switch 222. The determination of the maximum to minimum value ratio $I_r$ is shown in FIG. 3 by step 311.

The identifier 201 may in some embodiments also comprise an identifier switch 222 configured to receive the ratio $I_r$ calculated by the ratio calculator 221, and also configured to receive the minimum rms value $I_{min}$ at a comparison input. The identifier switch 222 may in some embodiments be configured to output the ratio $I_r$ calculated by the ratio calculator 221 when the value of the minimum rms value $I_{min}$ is greater than a switch threshold $L_{th}$. The switch threshold $L_{th}$ may be predetermined to prevent the outputting of ratio values $I_r$ when the minimum RMS value is low and thus quantization noise would be significant in the minimum RMS value.

The detection of whether the minimum rms value $I_{min}$ is greater than the switch threshold $L_{th}$ is shown in FIG. 3 by step 312. The selection of the new ratio value $I_r$ to be output is shown in FIG. 3 by step 314 when the detection determines that the $I_{min}$ is greater than the switch threshold $L_{th}$, whereas the blocking of the new ratio value $I_r$ is shown in FIG. 3 by step 313.

The ratio value $I_r$ may be output in some embodiments to the second low pass filter (LPF2) 223.

The identifier 201 may in some embodiments also comprise a second low pass filter (LPF2) 223. The second low pass filter (LPF2) 223 receives in some embodiments the maximum to minimum RMS ratio value $I_r$ and performs a low pass filtering on the ratio value to effectively smooth the ratio value. In some embodiments may be implemented by a first order infinite impulse response (IIR) filter. The output of the second low pass filter 223, may be defined as the signal identifier value y and is in some embodiments output to the speech/music detector 207. The second low pass filtering of the ratio values is shown in FIG. 3 by step 315.

The noise level estimator 203 also receives the signal samples as shown in FIG. 3 by step 301.

The noise level estimator 203 comprises a high pass filter (HPF) 230. The high pass filter (HPF) 230 may be implemented by any suitable method and is configured to attempt to filter the audio signal so to select the high frequency noise components of the audio signal while rejecting the voice and low frequency music components of the audio signal. The high pass filter in some embodiments outputs the filtered audio signals to the noise level estimator 203 RMS calculator 231. The high pass filtering of the audio signal is shown in FIG. 3 by step 320.

The noise level estimator 203 further comprises an RMS calculator 231 which calculates the RMS value over the frame. The calculation of the RMS values for the high pass filtered audio signal may be implemented in embodiments in similar ways to that described above with respect to the low pass filtered audio signal RMS calculator 213 as implemented in the identifier 201. The RMS calculator 231 outputs the RMS value on a frame by frame value to the noise level estimator buffer 233. The operation of calculating the RMS values is shown in FIG. 3 by step 321.

The noise level estimator 203 may in some embodiments also comprise a noise level estimator buffer 233 which receives the frame noise level estimator RMS value and stores it in the buffer 233 memory. The buffer 233 is configured to store the last N frame noise level estimator RMS values. As described above in some embodiments the value N is 10. In some embodiments the value of N is predefined. In some embodiments the value of N may be changed during the operation of the apparatus. As also discussed above some embodiments may be implemented with values of N as small as 2 and as large as is deemed to be suitable in light that the larger the value of N the longer the detection latency. The buffering of N frame noise level estimator RMS values is shown in FIG. 3 by step 323. The buffer 233 in some embodiments outputs the RMS values for the last N frames to the minimum noise level estimator RMS value selector 235.

The noise level estimator 203 may in some embodiments also comprise a minimum RMS selector 235. The minimum RMS selector 235 in some embodiments receives the noise level estimator RMS values from the buffer 233 and selects a noise level estimator minimum RMS value. The minimum RMS selector 235 outputs the minimum RMS value to a third low pass filter (LPF3') 237.

The operation of selecting the noise level estimator minimum RMS value $r_{min}$ is shown in FIG. 3 by step 325.

The noise level estimator 203 may in some embodiments also comprise a third low pass filter (LPF3') 237. The third low pass filter (LPF3') 237 in these embodiments applies a low pass filtering to the noise level estimator minimum RMS value and outputs the low pass filtered value $r_h$ to a multiplier 239 to determine a minimum RMS value ratio.

The noise level estimator 203 may in some embodiments also comprise further third low pass filter (LPF3) 209 which is configured to receive the minimum RMS value $I_{min}$ from the identifier minimum RMS selector 219 and apply the same low pass filtering as employed in the third low pass filter (LPF3') 237 on the noise level estimator minimum RMS value $r_{min}$. Both the third low pass filter 237 and the further low pass filter 209 may in some embodiments be implemented by a first order IIR filter. The further third low pass filter (LPF3) 209 outputs the filtered minimum RMS value $r_i$ to an inverter 210.

The noise level estimator 203 may in some embodiments also comprise an inverter 210 which inverts the filtered minimum RMS value $r_i$. The inverted value is in some embodiments passed to a multiplier 239.

The noise level estimator 203 may in some embodiments also comprise a multiplier 239 which receives both the filtered noise level estimator minimum RMS value $r_h$ and the inverted filtered minimum RMS value $1/r_i$ to determine the ratio between the signal identifier and noise level estimator minimum RMS values $r_r$. The 'minimum ratio' value $r_r$ may then in some embodiments be output to the second switch 241. The determination of the 'minimum ratio' value $r_r$ is shown in FIG. 3 by step 327.

The noise level estimator 203 may in some embodiments also comprise a second switch 241. The second switch 241 may in some embodiments store internally a historic ratio value $r_z$. The second switch 241 may in some embodiments also store internally a noise threshold value $H_{th}$. The noise threshold value $H_{th}$ is a noise level threshold and determines a minimum noise level threshold.

The second switch 241 in some embodiments is configured to receive the 'minimum ratio' ratio $r_r$ calculated by the multiplier 239, and also configured to receive the filtered noise level estimator minimum rms value $r_h$. The second switch may in some embodiments be configured to output the 'minimum ratio' $r_r$ as the next value of r when the value of the filtered noise level estimator minimum rms value $r_h$ is greater than a noise threshold $H_{th}$ and the 'minimum ratio' value $r_r$ is greater than the historic ratio value $r_z$. Otherwise in these embodiments the second switch 241 is configured to output the historic ratio value $r_z$ as the next value of r. The noise threshold $H_{th}$ may be predetermined to prevent the outputting of ratio values $r_r$ when the noise level estimate minimum RMS value is low or if it drops against the historic value $r_z$.

The detection of whether the filtered noise level estimator minimum rms value $r_h$ is greater than a noise threshold $H_{th}$ and the 'minimum ratio' value $r_r$ is greater than the historic ratio value $r_z$ is shown in FIG. 3 by step 328. The selection of the new ratio value $r_r$ to be output as r is shown in FIG. 3 by step 329 when the detection determines that the filtered noise level estimator minimum rms value $r_h$ is greater than a noise threshold $H_{th}$ and the 'minimum ratio' value $r_r$ is greater than the historic ratio value $r_z$, whereas the outputting of the historic ratio value $r_z$ as the next value of r is shown in FIG. 3 by step 334.

The second switch 241 may in some embodiments output the next value of the noise level estimate parameter r to the speech/music detector 207 and also to a delay element 243.

The noise level estimator 203 may in some embodiments also comprise a delay element 243. The delay element 243 in these embodiments stores the next value of r and outputs the value r to a filter gain element 245.

The noise level estimator 203 may in some embodiments also comprise a filter gain element 245 which is configured to receive the value r, multiply it by a gain factor $g_f$ and output it as the new historic ratio value $r_z$ to be used in the second switch 241. The gain factor may be any suitable gain value.

The speech/music detector 207 in some embodiments receives both the signal identifier value y, the noise identifier value r (which may be either a value of $r_r$ or $r_z$) and the low pass filtered noise level estimate minimum RMS value $r_h$ from these values then determines whether or not the current audio signal is speech or music. The speech/music detector in some embodiments determines whether the signal identifier value y is less than a threshold value $Y_{th}$. Furthermore in some embodiments the speech/music detector 207 determines whether the noise identifier value r is also less than a threshold value $R_{th}$ or whether the low pass filtered noise level estimate minimum RMS value $r_h$ is less than the noise threshold value $H_{th}$.

If the speech/music detector 207 determines that the conditions are true, in other words the signal and at least one of the noise values are less than the associated threshold values, then the speech/music detector 207 in some embodiments determines that the current audio signal is music. If either the signal or both of the noise values are not less than their associated threshold values the speech/music detector 207 in these embodiments determines that the current audio signal is speech. In some embodiments the speech/music detector 207 outputs an indicator coded with the result of the determination. The second determination or condition determination of checking the values r and $r_h$ indicates that if the speech/music detector 207 determines in these embodiments that there is too much noise in that both the $r_h$ and r values are higher than a threshold then there is too much noise in the signal to make a reliable identification and the detector chooses to output a speech indication.

The determination of the conditions, and therefore the detection of either speech or music, is shown in FIG. 3 by step 332. Furthermore the operation of indicating the audio signal is music is shown in FIG. 3 by step 333, whereas the operation of indicating the audio signal is speech is shown in FIG. 3 by step 335.

In some embodiments the speech/music detector 207 stores the results of the condition checks as described above for a number of frames M. The speech/music detector 207 may be configured in such embodiments to only determine that the audio signal being processed is music when the conditions checks described above are true consistently for the number of frames where the condition check results are stored, in this example M. For example in some embodiments, the value of M may be 20. These embodiments further assist the detection of music/speech audio signals and help to prevent premature determination of music audio signals from being generated.

In other embodiments the determination of a music audio signal may be made if the speech/music detector determines that the above described conditions are met for a number, for example L of the M condition checks stored. In further embodiments the L of the M condition checks must be contiguous frame condition checks—in other words that the audio signal is consistently being determined as being a music audio signal.

In some embodiments of the application the apparatus further comprises a reset operator 205. The reset operator 205 is configured to reset the noise level estimator buffer 233 and the identifier buffer 215 at the beginning of every new call or start of communication. Furthermore in some embodiments the reset operator 205 may be configured to hold or pause the identifier/noise level estimator buffers, in other words prevent the RMS values from being taken into account when the device is not receiving any data.

The apparatus shown above as well as the method described above may be used for both narrowband and wideband downlink signals. However, different values of frame length M, buffered frames N and threshold values $R_{th}$, $H_{th}$ and $Y_{th}$ may be selected dependent on the application of the embodiment in question.

The above methods have been simulated with some speech and music samples.

In these simulations, white noise was added to the samples in order to evaluate the simulated apparatus method noise robustness. The results of the simulation indicated that at a signal to noise ratio of 50 dB 100% of all speech frames were detected whereas the detection accuracy of music frames (when music signal frames are detected as music) is between 84% to 89%. With a reduced signal to noise ratio of 40 dB, the detection accuracy of music reduced to 63% and as the signal to noise ratio further was reduced the simulated apparatus performance degraded further. In normal practice however it is unlikely that music will be played to a user equipment in such noisy conditions.

Thus in summary there is according to some embodiments a method comprising: determining a signal identification value for an audio signal; determining at least one noise level value for the audio signal; comparing the signal identification value against a signal identification threshold and each of the at least one noise level value against an associated noise level threshold; and identifying the audio signal dependent on the comparison.

In some embodiments of the invention, the speech/music identifier may be implemented as an application in the user equipment to detect whether or not a user is being forced to listen to music in a waiting line or hold scenario. When the waiting line music is detected, in these embodiments, the application may trigger the user equipment to substitute music from the user equipment's own music library rather than the "elevator music" played in the waiting line.

In some further embodiments the speech/music detection apparatus may be implemented in applications such as speech-to-text applications where the speech-to-text feature determines when speech is being input and when music is being input in order to prevent the speech-to-text application from attempting to transcribing music and therefore creating errors.

Generally downlink audio processing algorithms may implement these embodiments and thus have different optimised tuning parameters for both speech and music audio signals. The detection of the audio signal character as described above thus enables these downlink audio processing algorithms to more efficiently operate.

In some embodiments of the invention the identifier noise level estimator and speech/music detector apparatus may be implemented in the audio chain after signal decoding and before any algorithm which modifies the signal in order to produce the most effective analysis of the audio signal.

In these embodiments the apparatus and methods above will have three advantages. Firstly these embodiments are particularly effective for AMR decoded signals. Secondly these embodiments have good performance with audio signals with good signal to noise ratios and do not require large amounts of memory or computing power. Thirdly these embodiments minimise errors where speech is identified as music due to background noise level estimation.

It shall be appreciated that the term user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Thus at least some embodiments may be apparatus comprising: a signal parameter estimator configured to determine a signal identification value for an audio signal; a noise level estimator configured to determine at least one noise level value for the audio signal; and a signal classifier configured to identify the audio signal dependent on comparing the signal identification value against a signal identification threshold and each of the at least one noise level value against an associated noise level threshold.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

Thus in some embodiments there may be an apparatus comprising at least one processor and at least one memory including computer program code the at least one memory and the computer program code configured to, with the at least one processor, cause the apparatus at least to perform: determining a signal identification value for an audio signal; determining at least one noise level value for the audio signal; comparing the signal identification value against a signal identification threshold and each of the at least one noise level value against an associated noise level threshold; and identifying the audio signal dependent on the comparison.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:
(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims.

However, all such and similar modifications of the teachings of this invention will still fall within the scope of this invention as defined in the appended claims.

The invention claimed is:

1. A method of audio classification comprising:
determining, by a user equipment, a signal identification value for a downlink encoded audio signal received by the user equipment, wherein determining the signal identification value comprises identifying at least two frames as sample values of the encoded audio signal, low pass filtering the sample values of the encoded audio signal, determining a maximum root mean square value and a minimum root mean square value of the low pass filtered encoded audio signal sample values, and determining a ratio value of the maximum root mean square value and the minimum root mean square value of the low pass filtered encoded audio signal sample values based on the at least two frames, where the ratio value is used to determine the signal identification value;
determining, by the user equipment, at least one noise level value for the received downlink encoded audio signal, wherein determining the at least one noise level value comprises high pass filtering the sample values of the encoded audio signal, determining at least two root mean square values for the high pass filtered encoded audio signal sample values; selecting a minimum root mean square value from the at least two root mean square values; and low pass filtering the minimum root mean square value from the at least two root mean values to determine the at least one noise level value for the downlink encoded audio signal;
comparing, by the user equipment, the signal identification value against a signal identification threshold, and the at least one noise level value against an associated noise level threshold; and
identifying, by the user equipment, the received downlink encoded audio signal as a speech audio signal or a music audio signal dependent on the comparison.

2. The method as claimed in claim 1, wherein the identifying the received downlink encoded audio signal comprises identifying the received downlink encoded audio signal as the music audio signal when the signal identification value is less than the signal identification threshold and at least one of the at least one noise level value is less than the associated noise level threshold.

3. The method as claimed in claim 1, wherein the identifying the received downlink encoded audio signal further comprises identifying the received downlink encoded audio signal as the music audio signal when at least one of the signal identification value is less than the signal identification threshold, and the at least one noise level value is less than the associated noise level threshold.

4. The method as claimed in claim 1, wherein the determining a signal identification value comprises:
low pass filtering the ratio of the maximum root mean square value and the minimum root mean square value.

5. The method as claimed in claim 1, further comprising:
determining the minimum root mean square value of the low pass filtered encoded audio signal is less than a signal level threshold; and
discarding the determined ratio value of the maximum root mean square value and the minimum root mean square value of the low passed encoded audio signal dependent on determining the minimum root mean square value of the low passed encoded audio signal is less than the signal level threshold.

6. The method as claimed in claim 1, wherein determining a second of the at least one noise level value for the received downlink encoded audio signal comprises:
high pass filtering the encoded audio signal sample values;
selecting the minimum root mean square value from the high pass filtered encoded audio signal sample values;
low pass filtering the encoded audio signal sample values;
selecting the minimum root mean square value from the low pass filtered encoded audio signal sample values;
determining a ratio of the low pass filtered minimum root mean square values from the low pass filtered and the high pass filtered encoded audio signal sample values; and
determining the second of the at least one noise level value for the encoded audio signal to be the ratio of the low pass filtered minimum root mean square values from the low pass filtered and high pass filtered encoded audio signal sample values.

7. The method as claimed in claim 1, further comprising buffering the minimum and the maximum root mean square values for the low pass filtered encoded audio signal sample values.

8. The method as claimed in claim 6, further comprising buffering the minimum and a maximum root mean square value for the high pass filtered encoded audio signal sample values.

9. The method as claimed in claim 1, wherein the identifying the received downlink encoded audio signal further comprises identifying the received downlink encoded audio signal as the speech audio signal when at least one of the signal identification value is equal or more than the signal identification threshold, and the at least one noise level value is equal or more than the associated noise level threshold.

10. An apparatus comprising at least one processor and at least one memory including computer program code, the at least one memory and the computer program code configured to, with the at least one processor, cause the apparatus at least to:
determine a signal identification value for a downlink encoded audio signal received by the apparatus, wherein determining the signal identification value comprises identifying at least two frames as sample values for the encoded audio signal, low pass filtering the sample values of the encoded audio signal, determining a maximum root mean square value and a minimum root mean square value of the low pass filtered encoded audio signal sample values, and determining a ratio value of the maximum root mean square value and the minimum root mean square value of the low pass filtered encoded audio signal sample values based on the at least two frames, where the ratio value is used to determine the signal identification value;
determine at least one noise level value for the received downlink encoded audio signal, wherein determining the at least one noise level value comprises high pass filtering the sample values of the encoded audio signal, determining at least two root mean square values for the high pass filtered encoded audio signal sample values; selecting a minimum root mean square value from the at least two root mean values; and low pass filtering the minimum root mean square value from the at least two root mean values to determine the at least one noise level value for the downlink encoded audio signal;
compare the signal identification value against a signal identification threshold, and the at least one noise level value against an associated noise level threshold; and
identify the received downlink encoded audio signal as a speech audio signal or a music audio signal dependent on the comparison.

11. The apparatus as claimed in claim 10, wherein causing the apparatus to identify the received downlink encoded audio signal causes the apparatus at least to identify the received downlink encoded audio signal as the music audio signal when the signal identification value is less than the signal identification threshold and the at least one noise level value is less than the associated noise level threshold, else the identifying comprises identifying that the downlink encoded audio signal as the speech audio signal.

12. The apparatus as claimed in claim 10, wherein causing the apparatus to identify the received downlink encoded audio signal further causes the apparatus at least to identify the received downlink encoded audio signal as the speech audio signal when either the signal identification value is equal or more than the signal identification threshold and/or all of the at least one noise level value is equal or more than the associated noise level threshold.

13. The apparatus as claimed in claim 10, wherein causing the apparatus to determine a signal identification value causes the apparatus at least to:
low pass filter the ratio of the maximum root mean square value and the minimum root mean square value.

14. The apparatus as claimed in claim 10, wherein the at least one processor and at least one memory further cause the apparatus at least to:
determine the minimum root mean square value is less than a signal level threshold; and
discard the determined ratio of the maximum root mean square value and the minimum root mean square value dependent on a determination of the minimum root mean square value is less than the signal level threshold.

15. The apparatus as claimed in claim 10, wherein causing the apparatus to determine a second of the at least one noise level value for the received downlink encoded audio signal causes the apparatus at least to:
high pass filter the encoded audio signal sample values;
select the minimum root mean square value from the high pass filtered encoded audio signal sample values;
low pass filter the encoded audio signal sample values;
determine the minimum root mean square value from the low pass filtered encoded audio signal sample values;
determine the ratio of the low pass filtered minimum root mean square values from the low pass filtered and high pass filtered encoded audio signal sample values; and
determine the second of the at least one noise level value for the encoded audio signal to be either the ratio of the low pass filtered minimum root mean square values from the low pass filtered and high pass filtered encoded audio signal sample values.

16. The apparatus as claimed in claim 13, the at least one processor and at least one memory further cause the apparatus at least to buffer the minimum and the maximum root mean square values for the low pass filtered encoded audio signal sample values.

17. The apparatus as claimed in claim 10, the at least one processor and at least one memory further cause the apparatus at least to buffer the minimum and the maximum root mean square values for the high pass filtered encoded audio signal sample values.

* * * * *